Aug. 20, 1935.  C. F. DREYER  2,011,931

GAUGING APPARATUS

Filed Dec. 5, 1931

Inventor
C. F. Dreyer
By H. A. Whitehorn  Att'y.

Patented Aug. 20, 1935

2,011,931

UNITED STATES PATENT OFFICE 2,011,931

GAUGING APPARATUS

Charles F. Dreyer, La Grange, Ill., assignor to Western Electric Company, Incorporated, New York, N. Y., a corporation of New York Application December 5, 1931, Serial No. 579,199

3 Claims. (Cl. 33—174)

This invention relates to gauging apparatus, and more particularly to apparatus for measuring and visually indicating the degree of taper of articles, gauging the taper of flat or conical objects or the departure from a predetermined standard of cylindrical objects.

It is an object of the present invention to provide a simple and highly accurate apparatus for gauging articles.

In accordance with one embodiment, the invention contemplates the provision of an apparatus having a standard support for an article and a pair of gauging plungers arranged to engage the article at spaced points along the surface opposite the support, the gauging plungers being operatively associated with a single element in such a manner that relative movements of the gauging plungers will cause a deflection of the single element. The single element may have associated therewith various means whereby the degree of difference, between the measurements of the article at the two points, may be determined, one of these means may be calibrations positioned at the free end thereof and another may be signal lamps included in circuits which may be closed by the single element moving a predetermined distance in one direction or the other.

Figure 1:
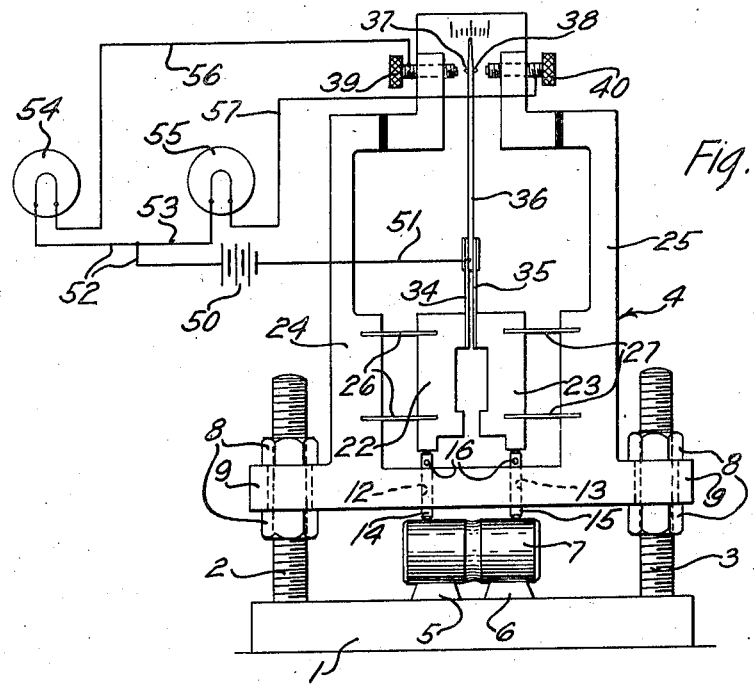
Figure 2:
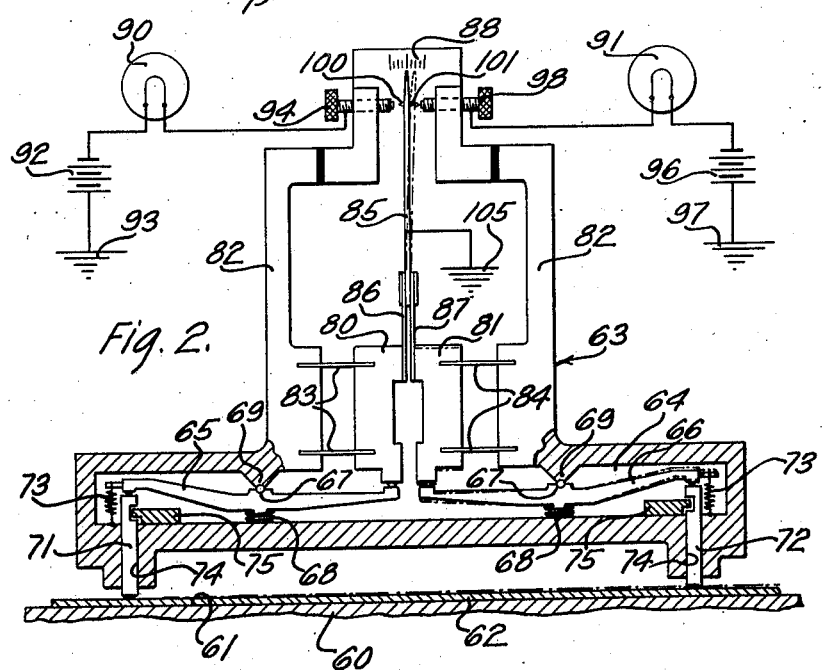

A better understanding of the invention may be had from the following description taken in conjunction with the accompanying drawing, wherein Fig. 1 is a front elevational view of one embodiment of the invention, and Fig. 2 is a front elevational view of another embodiment of the invention.

In the illustration embodied in Fig. 1, the numeral 1 indicates a base which may be positioned upon a suitable support, such as a table (not shown), and which has extending upwardly therefrom a pair of threaded members 2 and 3 for adjustably supporting a frame 4. Positioned upon the base 1 is a pair of anvils or article supports 5 and 6 upon which an article, such as a piston pin 7, may be disposed for the purpose of being gauged. In this embodiment the anvils 5 and 6 have flat upper surfaces in perfect alignment with each other so that an accurate gauging operation may be performed upon a cylindrical object disposed thereon. However, it will be obvious that if another type of article is to be gauged, such as one of conical formation, the upper surfaces of the anvils may be shaped accordingly, without departing from the scope of the present invention.

The frame, indicated generally at 4, may be adjusted vertically with respect to the base and locked in adjusted position by suitable means such as lock nuts 8 which are disposed upon the threaded members 2 and 3 above and below laterally extending flanges 9 of the frame.

Slidably mounted in apertures 12 and 13 in the lower portion of the frame 4 is a pair of article engaging plungers 14 and 15, the lower ends of which are adapted to engage the article being gauged at spaced positions. These plungers are prevented from dropping through their respective apertures in the frame by stop members 16 extending laterally from the upper ends of the plungers. The upper ends of the plungers 14 and 15 are rounded and engage movable members 22 and 23, respectively. The members 22 and 23 are movably secured to upwardly extending portions 24 and 25 of the frame 4 by means of spaced parallel leaf springs 26 and 27, respectively, which permit the members to be moved independently of each other in a vertical plane while restraining their movement in a horizontal plane beyond predetermined limits as determined by the pivotal action of the springs.

The movable members 22 and 23 have fixed to their upper and innermost portions single leaf springs 34 and 35, respectively, both of which are secured to a single circuit controlling or indicating member 36 which, when used as an indicating member is movable relative to calibrations positioned in arcuate arrangement adjacent the free end thereof.

The member 36 when used as a circuit controlling member is included as part of a circuit and has contacts 37 and 38 mounted upon opposite sides and adjacent the free end thereof. The contacts 37 and 38 cooperate with adjustable contacts 39 and 40, respectively, for controlling circuits, the adjustable contacts 39 and 40 being movable toward or away from each other to vary the distance between them as required by the degree of accuracy with which it is desired to gauge the article.

The circuit, which is controlled by the circuit controlling or indicating member 36, may be of the type which will operate a visual signal, an audible signal or any form of relay or solenoid, but for the sake of simplifying the disclosure a very simple type of visual signal circuit is illustrated wherein a source of current 50 has one side thereof connected, through a lead 51, to the circuit controlling or indicating member 36 and has the other side thereof connected through leads 52 and 53 in parallel to the filaments of lamps or visual indicating signals 54 and 55, respectively. The other side of the filaments of the lamps 54 and 55 are connected through leads 56 and 57 to the adjustable contacts 39 and 40, respectively.

In illustrating the operation of the embodiments shown in Fig. 1, let it be assumed that it is desired to measure the difference from a predetermined standard of the piston pin 7. The piston pin 7 may be positioned upon the anvils 5 and 6 with the plungers 14 and 15 engaging the upper surfaces thereof, whereupon, in the event that the dimension between the end of the plunger 14 and the upper surface of the anvil 5 is the same as the dimension between the end of the plunger 15 and the upper surface of the anvil 6, the movable members 22 and 23 may be moved upwardly but each will be moved the same distance and the circuit controlling or indicating member 36 may be moved vertically but not horizontally. However, if one end of the piston pin 7, for example, the right end, is smaller in diameter than the other, the plunger 14 will be moved upwardly a greater distance than the plunger 15 and will carry with it the movable member 22, which in turn will be moved upwardly a greater distance than the movable member 23. This section will result in movement of the single cantilever spring 35 and cause a deflection to the right of the circuit controlling member 36, bringing the contact member 38 into engagement with the contact 40 to complete a circuit through a lamp 55. This circuit is from the battery 50, through the lead 51, the circuit controlling or indicating member 36, the contacts 38 and 40, the conductor 57, through the filament of the lamp 55, and through the conductor 53 to the battery 50, lighting the lamp 55 and thereby indicating that the right end of the piston pin 7 is smaller than the left end thereof.

If the left end of the piston pin 7 were smaller than the right end, a similar action of the circuit controlling member 36 would take place except that it would be moved to the left to cause the lamp 54 to light, thereby indicating that the left side of the pin is smaller than the right.

The illustration in Fig. 2 has features in common to the illustration in Fig. 1, the illustration in Fig. 2, however, being arranged to gauge substantially flat objects, such as sheet material. This illustration includes a base 60 which may be positioned upon a suitable support, such as a table (not shown). The upper surface 61 of the base 60 is finished to provide an accurate gauging surface upon which an article 62, such as a sheet of material, may be disposed to be gauged. Positioned above the base 60 is a frame indicated generally at 63, which may be supported in any suitable manner, such as shown in Fig. 1, for adjustably securing the frame 4 to the base 1, so that the frame 63 may be properly positioned above the gauging surface 61 of the base 60. The lower portion of the frame 63 is hollow, forming a housing 64 for rocking levers 65 and 66, which have concave recesses in their upper surfaces adjacent the centers thereof for receiving fulcrum pins 67. The rocking levers 65 and 66 are urged upwardly into registration with the fulcrum pins 67 by helical springs 68. V-shaped recessed projections 69, which are integral with the housing 64 of the frame 63, form retaining members for the fulcrum pins 67.

The outer ends of the levers 65 and 66 have semi-spherical portions which rest upon article engaging plungers 71 and 72, the semi-spherical members being held in engagement with the plungers by springs 73, which also normally urge the outer ends of the levers 65 and 66 downwardly. The plungers 71 and 72 are vertically movable in apertures 74 in the housing 64 and are recessed adjacent their upper ends for receiving projecting stop members 75 arranged to limit the vertical movement of the plungers. The inner ends of the levers 65 and 66 engage movable members 80 and 81 which are movably secured to upwardly extending portions 82 of the frame 63 by horizontally disposed leaf springs 83 and 84, respectively. A circuit controlling or indicating member 85 is operatively connected to the movable members 80 and 81 at their inner and upper portions by vertically extending leaf springs 86 and 87, respectively. When the member 85 is to be used as an indicating member, the variation in thickness of the article being gauged may be determined by the position of the member 85 relative to calibrations 88 positioned adjacent thereto.

When the member 85 is to be used as a means of controlling circuits, the calibrations 88 may be disregarded, the operator directing his attention to lamps 90 and 91, which are used as visual indicating members and are included in circuits, either of which may be closed by the actuation of the member 85, depending upon the condition of the article being gauged. The lamp 90 is included in a circuit provided with a source of current, such as a battery 92, which has one lead extending to ground at 93 and the other lead extending through the lamp 90 to an adjustable contact 94, which is carried by the upwardly extending portion 82 of the frame 63 positioned upon the left side of the member 85. The lamp 91 is included in a circuit provided with a source of current, such as a battery 96, having one of its leads extending to ground, as at 97, and the other lead including the lamp 91 and extending to an adjustable contact 98 carried by the upwardly extending portion 82 of the frame 63 positioned at the right of the member 85. The member 85 is provided with contact points 100 and 101 arranged to engage the adjustable contacts 94 and 98, respectively, when lateral movement is imparted to the member 85.

In illustrating the operation of the embodiment shown in Fig. 2, let it be assumed that the article 62 is positioned upon the gauging surface 61, beneath the gauging plungers 71 and 72, and that the thickness of the portions of the article beneath the gauging plungers are the same. The article may move the gauging plungers 71 and 72 upwardly but the movement of each of these plungers will be the same, therefore causing an equal movement of the rocking levers 65 and 66 about their fulcrums and causing an equal downward movement of the movable members 80 and 81. The springs 73 have sufficient force to move the members 80 and 81 upwardly from their normal positions against the tension of the springs 83 and 84 while the apparatus is not in operation, that is, while there is no article positioned between the gauging plungers 71 and 72 and the gauging surface 61. The downward movement of the movable members 80 and 81, which is caused by the force of the springs 83 and 84 aided by gravity, will vary the position of the member 85 vertically but not horizontally. Therefore, when the article 62, positioned upon the gauging surface 61 beneath the gauging plungers 71 and 72, is substantially equal in thickness, there is not a sufficient horizontal displacement of the member 85 to move the contact points 100 and 101 into engagement with either of the adjustable contacts 94 or 98, the article conforms to a predetermined standard. However, if one side of the article 62, for example the right side, is thicker than the other side thereof, the gauging plunger 72 will be moved upwardly a greater distance than the gauging plunger 71, thus moving the rocking lever 66 about its fulcrum 67 a distance greater than the movement imparted to the lever 65, as shown in dotted lines in Fig. 2. Even though the rocking lever 65 may be moved, due to the positioning of the article 62 beneath the plunger 71, the movement thereof will be less than that of the lever 66. Therefore, the movable member 81, which is held in constant engagement with the lever 66 by the springs 84, is allowed to move downwardly a greater distance than the movement of the member 80, causing a slight deformation of the springs 86 and 87 to cause the member 85 to move to the right and into the dotted line position where it positions the contact point 101 in electrical engagement with the adjustable contact 98, closing a circuit through the lamp 91.

The member 85 is connected to ground 105 and when contact is made with the adjustable contact 98, a current will flow from the battery 96, through the lamp 91, the adjustable contact 98, the contact point 101, through the member 85, to ground 105 and back to the battery 96 through ground 97. This embodiment of the invention, therefore, indicates the taper of the article being gauged or the departure from a predetermined standard for flat articles. If the article varies in thickness so that the right side thereof is thicker than the left side, the member 85 will be swung to the right, as defined in the foregoing, closing the circuit through the lamp 91 positioned upon the right side of the apparatus, whereas if the left side of the article is thicker than the right side thereof, the plunger 71, the lever 65 and the movable member 80 will be moved a greater distance than the corresponding plunger 72, the lever 66 and the member 81, causing a deflection of the member 85 to the left and closing the circuit through the lamp 90 to indicate to the operator that the left side of the article is thicker than the right side and the variance thereof in thickness is beyond the predetermined standard.

With apparatus of the character described hereinbefore, it will be apparent that by using standard precision size blocks, or other physical representations of the sizes required, the apparatus may be set up so that by adjusting the means for supporting the frames 4 and 63 to properly position them relative to the bases 1 and 60, the article being gauged may be assigned certain limits beyond which it may not deviate as regards its taper and within which the article will be acceptable for use. These limits may be exceedingly close, since the movement of the member 36 in Fig. 1 and the member 85 in Fig. 2 is so much greater than the movement of the gauging plungers, that very fine differences will be indicated by the visual indicating system.

Although a specific embodiment of this invention has been described hereinbefore, it is to be understood that the invention is capable of many modifications without departent from the scope thereof which is to be limited by the scope of the appended claims.

What is claimed is:

1. In an apparatus for gauging articles, means for supporting an article to be gauged, a stationary member, a pair of movable members, resilient means for movably securing the movable members to said stationary member, a single indicating element, resilient means for operatively connecting said indicating element to said movable members, and gauging plungers arranged to engage the article at spaced points respectively and each associated with one of said movable members for actuating said movable members, depending upon the relative dimensions of the article adjacent said gauging plungers.

2. In an apparatus for gauging articles, a stationary framework, two sets of parallel reeds extending inwardly from said framework and carried thereby, a pair of movable members respectively fixed to the sets of parallel reeds which serve as resilient supports therefor, elements for engaging an article at spaced points and operatively associated with said members respectively to cause movement of said members respectively, a pointer, and closely adjacent flat springs connecting the base of the pointer to said members respectively.

3. In an apparatus for gauging the taper of an article, a stationary framework, a pair of movable members carried by said framework, spaced work engaging elements operatively associated with said movable members, means for supporting an article so that spaced portions thereof will engage and cause movement of said elements respectively to move said movable members respectively, a pointer, and closely adjacent flat parallel springs each having one of their ends connected to the base of the pointer and their other ends connected to said movable members respectively for supporting said pointer and for imparting movement thereto in either direction depending upon the relative movement of said movable members.

CHARLES F. DREYER.